(No Model.)

C. B. McKINNEY.
DRILLING JAR.

No. 380,634. Patented Apr. 3, 1888.

Witnesses.
H. M. Sturgeon.
G. J. Mead.

Inventor.
Charles B. McKinney.
Per H. M. Sturgeon.
Atty.

UNITED STATES PATENT OFFICE.

CHARLES B. McKINNEY, OF TARPORT, ASSIGNOR OF ONE-HALF TO WILLIAM C. WALKER, OF BRADFORD, PENNSYLVANIA.

DRILLING-JAR.

SPECIFICATION forming part of Letters Patent No. 380,634, dated April 3, 1888.

Application filed July 29, 1887. Serial No. 245,603. (No model.)

*To all whom it may concern:*

Be it known that I, CHARLES B. McKINNEY, a citizen of the United States, residing at Tarport, in the county of McKean and State of Pennsylvania, have invented certain new and useful Improvements in Drilling-Jars; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in drilling-jars hereinafter set forth and described in the specification and claims, and illustrated in the accompanying drawings, in which—

Figure 1:
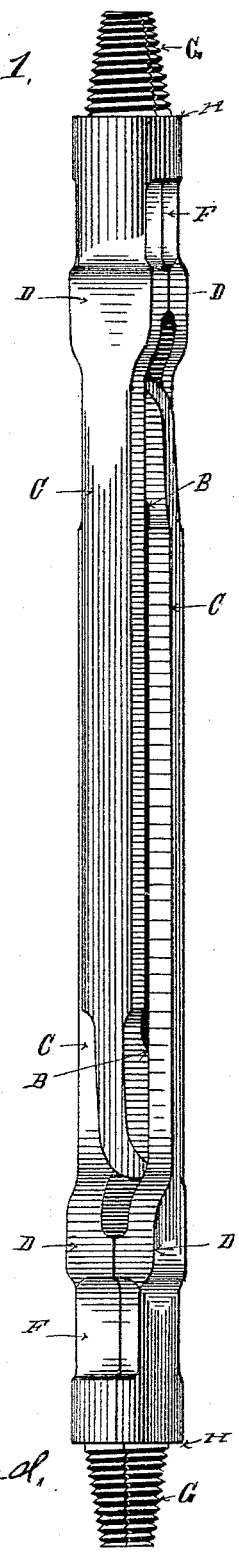
Figure 2:
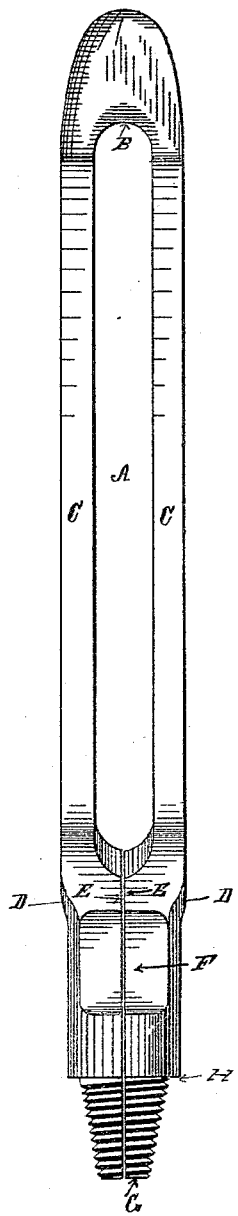

Figure 1 is a perspective view of my improved drilling-jar complete. Fig. 2 is a side elevation of one of the sections of my improved drilling-jar.

Like letters refer to like parts in all the figures.

The objects of my invention are, first, to construct the parts of a drilling-jar so as to avoid the necessity of welding the ends thereof together, it being very difficult to weld the ends of a jar together so that when the sides cool they will be of equal length, the shrinkage nearly always causing such unequal strain on the sides of the jar that their liability to break is thereby greatly increased; second, so as to construct each section of the jar of a continuous bar of steel without the necessity of welding the same together, nearly all of the jars broken being at the point where they are welded; third, so as to make the parts of the jar in duplicate, so that in case of breakage a new part can be sprung into the place of the broken section.

Other features of my invention appear hereinafter in the specification and claims.

In the construction of my improved drilling-jars I use, preferably, steel, taking a bar thereof of sufficient length to make section A, Fig. 2, in a single piece without welding. In doing this I make the bend B therein by bending the bar at that point, so that the sides C C are parallel to each other, substantially as shown. The curved part B being made thin enough to slide freely between the parallel sides C C of a corresponding section of the jar, the open ends of the sides C C being stove up, so as to form the enlarged ends D D, the inner parts, E E, of the ends D D are faced off, so that when brought together, as shown in Fig. 2, the sides C C of the section of the jar will be substantially parallel. I face off a portion of the enlarged ends D D, so as to form a square, F F, adapted to receive a wrench for screwing the pin G thereon into a socket (not shown) on the end of the connecting parts of the drilling mechanism. The pin G, I make one-half on each of the ends D D, and preferably tapering, substantially as shown, with a shoulder, H, adapted to come into contact with the end of the socket when the pin G is screwed therein.

In Fig. 1 I show the jar complete, consisting of two of the sections A, Fig. 2, placed together, as shown. It is obvious that any number of sections A, Fig. 2, constructed as hereinbefore described, can be made, and any two thereof, when put together, will form a complete jar ready for use. The parts can be placed together by springing the open ends D D apart, so that the curved portion B will pass between the faces E E thereof, when they will spring back into place. In this manner I avoid all danger of breakage from the welding together of the parts, or from the unequal strain on the sides C C, and as the parts are interchangeable, in case of breakage the broken section can be replaced at once by a new one.

Having thus fully described my invention, so as to enable others to construct and use the same, what I claim as new, and desire to secure by Letters Patent of the United States, is—

1. A drilling-jar composed of two links, each made of a single piece of metal and having the pin ends thereof open, substantially as and for the purpose set forth.

2. A drilling-jar section constructed of a single piece of metal, with the pin end thereof open, substantially as and for the purpose set forth.

3. The combination, in a drilling-jar, of two sections, A A, each of said sections having the ends D D thereof separated, substantially as shown, with one-half of the pin G on each of the ends D D, substantially as and for the purpose set forth.

In testimony whereof I affix my signature in presence of two witnesses.

CHARLES B. McKINNEY.

Witnesses:
GEO. S. STURGEON,
WILLIAM C. WALKER.